US009651673B2

(12) United States Patent  
Lacatus et al.

(10) Patent No.: US 9,651,673 B2  
(45) Date of Patent: May 16, 2017

(54) ENERGY CONSERVATION APPARATUS FOR GEOFENCE APPLICATIONS

(71) Applicant: QUALCOMM Incorporated, San Diego, CA (US)

(72) Inventors: Catalin Lacatus, San Diego, CA (US); Alaa-addin Moussa, Carlsbad, CA (US); Harleen K. Gill, Del Mar, CA (US); Hemish K. Parikh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1098 days.

(21) Appl. No.: 13/831,684

(22) Filed: Mar. 15, 2013

(65) Prior Publication Data

US 2014/0266883 A1 Sep. 18, 2014

(51) Int. Cl.
*G01S 19/24* (2010.01)
*G01S 19/34* (2010.01)
*H04W 52/02* (2009.01)
*G08B 21/02* (2006.01)

(52) U.S. Cl.
CPC ............ *G01S 19/24* (2013.01); *G01S 19/34* (2013.01); *H04W 52/0209* (2013.01); *G08B 21/023* (2013.01)

(58) Field of Classification Search
CPC ..... G01S 19/24; G01S 19/34; H04W 52/0209
USPC ............... 342/357.63, 357.74; 455/456.1
See application file for complete search history.

(56) References Cited

U.S. PATENT DOCUMENTS

| 7,308,272 | B1 | 12/2007 | Wortham | |
|---|---|---|---|---|
| 7,783,299 | B2 * | 8/2010 | Anderson | G01S 5/0205 |
| | | | | 455/456.1 |
| 8,229,473 | B1 | 7/2012 | De La Rue | |
| 8,812,024 | B2 * | 8/2014 | Obermeyer | G08B 21/0277 |
| | | | | 455/404.2 |
| 8,965,401 | B2 * | 2/2015 | Sheshadri | G01S 19/34 |
| | | | | 455/404.2 |
| 8,977,288 | B2 * | 3/2015 | Abraham | H04W 24/00 |
| | | | | 455/456.1 |
| 9,258,677 | B2 * | 2/2016 | Saha | H04W 4/021 |
| 9,274,229 | B2 * | 3/2016 | Abraham | G01S 19/34 |
| 9,451,402 | B2 * | 9/2016 | Srivastava | G01S 19/34 |

(Continued)

OTHER PUBLICATIONS

International Search Report and Written Opinion—PCT/US2014/028680—ISA/EPO—Jul. 17, 2014.

*Primary Examiner* — Chuong P Nguyen
(74) *Attorney, Agent, or Firm* — The Marbury Law Group, PLLC

(57) ABSTRACT

Methods, systems and devices are provided for operating a GPS engine in an active geofence monitoring state for no more than a first QoS period to obtain a first GPS fix. The GPS engine may also be set to operate in the active geofence monitoring state for no more than a second lower QoS period to obtain a second GPS fix in response to determining the first GPS fix was not obtained. The method may determine whether a geofence breach is detected in response to determining the GPS engine obtained the first GPS fix. The GPS engine may be set to operate in the active geofence monitoring state for no more than the second QoS period to obtain the second GPS fix in response to determining the geofence breach is not detected. The GPS engine may thus operate in the active geofence monitoring state to obtain the second GPS fix.

40 Claims, 10 Drawing Sheets

(56) References Cited

U.S. PATENT DOCUMENTS

| | | | |
|---|---|---|---|
| 2003/0201931 A1 | 10/2003 | Durst et al. | |
| 2008/0293436 A1* | 11/2008 | Fok | G01S 5/0205 |
| | | | 455/456.2 |
| 2009/0102713 A1 | 4/2009 | Sanchez et al. | |
| 2009/0278738 A1 | 11/2009 | Gopinath | |
| 2009/0312032 A1 | 12/2009 | Bornstein et al. | |
| 2010/0009696 A1* | 1/2010 | Fok | H04W 64/00 |
| | | | 455/456.1 |
| 2010/0017126 A1* | 1/2010 | Holcman | G08B 21/0227 |
| | | | 701/300 |
| 2010/0099377 A1 | 4/2010 | Jeong | |
| 2010/0127919 A1* | 5/2010 | Curran | H04W 4/021 |
| | | | 340/573.4 |
| 2010/0222081 A1* | 9/2010 | Ward | G01S 5/021 |
| | | | 455/456.3 |
| 2011/0050503 A1 | 3/2011 | Fong et al. | |
| 2015/0024773 A1* | 1/2015 | Li | H04W 4/021 |
| | | | 455/456.1 |
| 2015/0181382 A1* | 6/2015 | Mcdonald | H04L 67/18 |
| | | | 455/456.3 |

* cited by examiner

ENERGY CONSERVATION APPARATUS FOR GEOFENCE APPLICATIONS

FIELD

The present application relates generally to geofence applications that employ a Global Positioning System (GPS) engine, and more particularly to methods, devices and systems adapted to adjust a Quality of Service (QoS) parameter to conserve the power consumption and maintain a positive user experience with the device.

BACKGROUND

A GPS engine is a subsystem used generally by mobile devices and mobile tracking devices, for determining a location of the associated device. The GPS engine may include a data processor and receiver capable of receiving GPS satellite signals and producing an estimate of the position of the receiver. The GPS engine may include dedicated memory and/or work using non-dedicated memory. Also, the engine may run using an external processor to assist in or perform the estimation. When the GPS engine outputs a set of determined coordinates, based on processed signals received by way of its antenna, it is said to have yielded or obtained a position fix or simply a fix. As used herein, "yielding" and "obtaining" a GPS fix are used interchangeably. A GPS position fix (that is characterized by accuracy and uncertainty) is provided by the GPS engine with or without network assistance. The network may provide timing and additional information (i.e., almanac and/or ephemeris).

The power demands of mobile devices with GPS functionality, particularly those used to monitor whether the device is inside or outside a geographic boundary (referred to herein as a "geofence monitoring"), tend to mean they experience a reduced battery life when they are maintained in an active monitoring state. The fact that a GPS signal may often not be available, yet the device is maintained in an active monitoring state contributes to excess power consumption. For example, a device in an active geofence monitoring state may experience a battery life of 1-2 days, even though the battery life prediction for such devices is around 4 days. A device will generally consume a very high amount of energy while operating a GPS engine in an active monitoring state, particularly when the device is repeatedly not yielding a GPS fix.

SUMMARY

The various embodiments described herein include methods, systems and devices for operating a GPS engine for geofence applications. The embodiments may include operating the GPS engine in an active geofence monitoring state for no more than a first GPS engine running time limit (QoS period) to obtain a first GPS fix. Also, the method may determine whether the GPS engine yielded a first GPS fix. The GPS engine may also be set to operate in the active geofence monitoring state for no more than a second QoS period to obtain a second GPS fix in response to determining the first GPS fix was not obtained. The second QoS period may be substantially less than the first QoS period. Further, the method may determine whether a geofence breach is detected in response to determining the GPS engine obtained the first GPS fix. The GPS engine may further be set to operate in the active geofence monitoring state for no more than the second QoS period to obtain the second GPS fix in response to determining the geofence breach is not detected. The GPS engine may thus operate in the active geofence monitoring state to obtain the second GPS fix.

Further embodiments may include a computing device having a processor configured with processor-executable software instructions to perform various operations corresponding to the methods discussed above.

Further embodiments may include a computing device having various means for performing functions corresponding to the method operations discussed above.

Further embodiments may include a non-transitory computer readable storage medium having stored thereon processor-executable instructions configured to cause a processor to perform various operations corresponding to the method operations discussed above.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
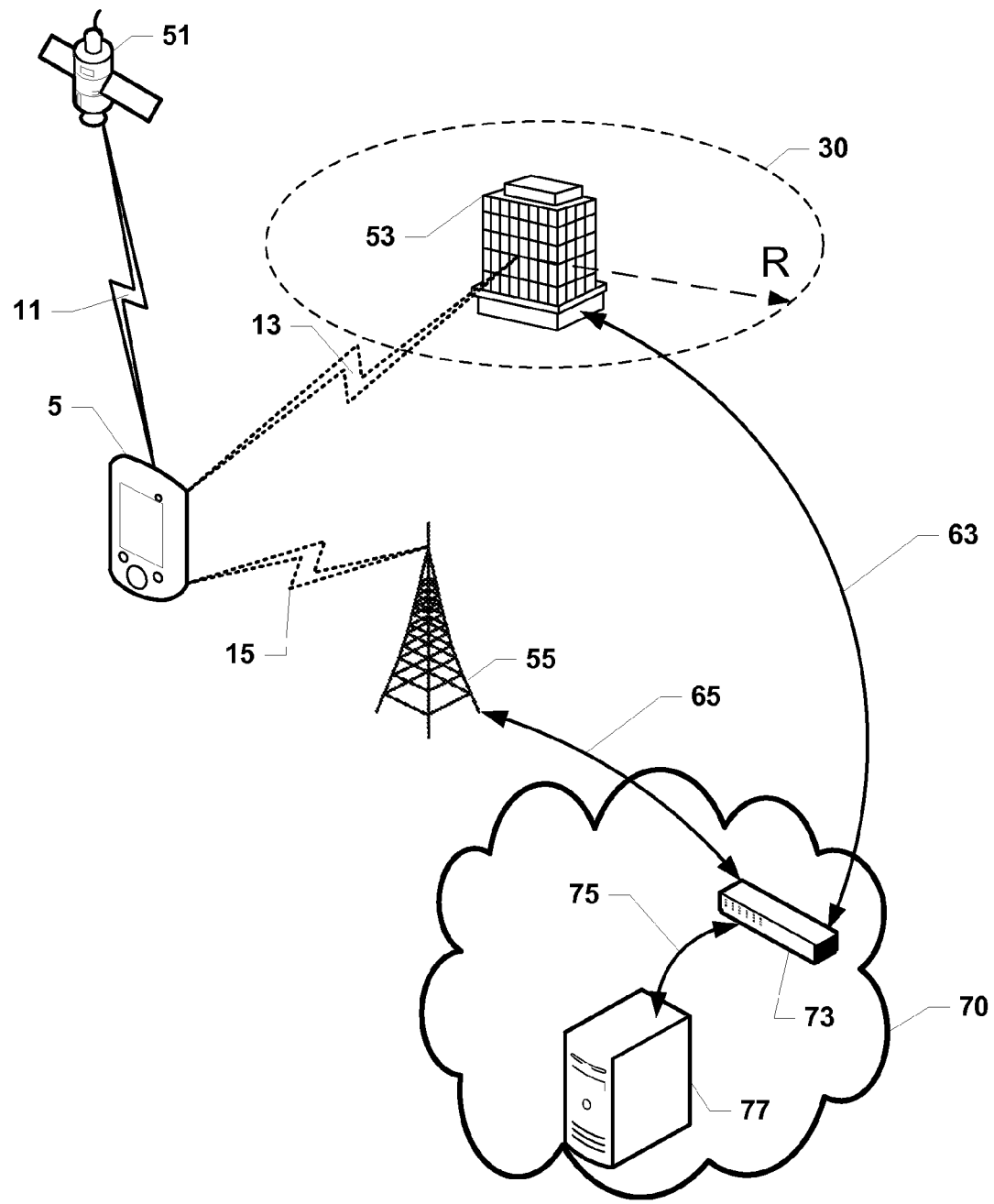
FIG. 1 is a schematic diagram illustrating a wireless tracking device receiving signals, suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any implementation described herein as "exemplary" is not necessarily to be construed as preferred or advantageous over other implementations. Additionally, use of the words "first" and "second" or similar verbiage is intended herein for clarity purposes to distinguish various described elements and is not intended to limit the invention to a particular order or hierarchy of elements.

As used herein, the terms "wireless tracking device" and "tracking device" are used interchangeably herein to refer to any one or all of electronic tracking tags, asset wireless tracking devices, cellular telephones, smart phones, mobile communication devices, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar mobile devices that include a programmable processor, memory, an antenna and circuitry for receiving a GPS signal and determining a location of the device. While the various embodiments are particularly useful in tracking devices, such as cell phones, tablets and laptops that have limited battery life, the embodiments are generally useful in any device that may use GPS receivers (with a GPS engine).

As used herein, the term "geofence" refers to a virtual boundary that may be defined by a continuous region surrounding one or more sets of coordinates (i.e., longitude, latitude, elevation). The continuous boundary associated with the geofence may have almost any shape and need not be a simple or symmetric uniform boundary. Also, as used herein the term "geofence monitoring state" refers to an operational state of a GPS engine in which it is actively monitoring its position relative to the geofence, particularly for determine either the device with the GPS engine has breached the geofence or not.

As used herein, the term "Quality of Service" (abbreviated as "QoS") or "QoS period" refers to a GPS engine parameter used to limit the maximum duration of the run-time of the GPS engine when obtaining a fix (i.e., determining its geographic coordinates). The QoS for a GPS engine defines the maximum period of time the engine is allowed to attempt to yield a fix, as well as some additional engine optimization time. The QoS is generally an existing adjustable parameter for a GPS engine. Also, for each GPS fix yield attempt, the time it takes to yield a fix, measured from when the GPS engine is placed in an active geofence monitoring state for that yield attempt, is referred to as the Time-To-Fix (TTF). The TTF is a variable that depends on the operational GPS conditions, while the QoS will limit the continuous period of time the device is allowed to attempt to yield a fix.

The systems, methods, and devices of the various embodiments enable operating a GPS engine, which considers a GPS fix environment, while conserving battery power. In order to prevent or minimize the device battery drain in challenging GPS conditions, a limit to how long the GPS engine is allowed to continuously run, attempting to yield a fix, may be changed in accordance with the various embodiments herein. In particular, power may be conserved for GPS engines used to monitor a geofence state of a device (i.e., inside or outside a geofence) by controlling the QoS of the GPS engine. In accordance with the various embodiments, when the GPS engine experiences a long TTF for a GPS yield attempt, the device may reduce the QoS for upcoming fixes. Also, the device may use QOS for a predetermined maximum configurable number of GPS fix yield attempts, after which the method may allow the GPS engine to attempt a fix with a greater QoS. Using the greater QoS after a predetermined maximum number of GPS fix yield attempts, may be used to determine whether the device is no longer in challenging GPS conditions.

The QoS impacts whether a GPS fix is reliably obtained as well as the quality of the fix. The quality of the fix relates to how much accuracy and uncertainty is associated with one or more fixes. In a clear open-sky environment (non-challenging GPS conditions) users may want maximum accuracy and minimum uncertainty at the expense of increased battery consumption. As discussed further below with regard to FIGS. 6 and 7, the accuracy and uncertainty may be quantified by the size of regions surrounding a fix position. In contrast, under challenging GPS conditions, a device may compensate the location accuracy with a high fix uncertainty that may decrease the FA rate in geofence applications and preserve the battery energy The QoS is a standard variable that may generally be adjusted for GPS engines, particularly when not using Continuous Tracking (CT) or On-Demand Location (ODL) fixing. In order to estimate the tracker position, the GPS engine acquires and processes the GPS signals. The GPS receiver, generally synchronized with particular GPS signals, may find a couple of satellite signals and eventually determine the location of the device based on that signals. Yielding a GPS fix refers to this position determination and is defined by a level of accuracy and uncertainty. The higher the accuracy needed for a GPS fix, the higher the QoS that should be used for that GPS fix attempt. In this way, in order to ensure a position is determined with a high level of accuracy, a high QoS may be used, but a high QoS generally demands a high level of power consumption from the tracking device. In contrast, were a high level of accuracy is not necessary, in accordance with the various embodiments herein, a low QoS may be used.

FIG. 1 illustrates a tracking device 5 receiving signals 11 from a satellite 51 in a clear open-sky environment. The tracking device 5 may also receive signals from terrestrial sources, such as a radio transmitter (not shown). Such signals 13 may include low-power short range radio transmissions from a nearby building 53. Alternatively, communication towers 55 employing a long range radio or wireless transceiver for establishing long range wireless communications links 15 may communicate with the tracking device 5. Communication towers 55 may include further communication links 65 linking them to a communication network 70. The short range radio transmitter may even be disposed within or on the building 53 or other structure. Alternatively, the tracking device 5 may be disposed within the building 53, which if not near a window may face challenging GPS conditions. Also, a geofence 30 is shown established relative to the building 53, which may be used to aid in identifying devices as being in close proximity thereto. FIG. 1 shows the region associated with the geofence 30 as having a fixed radius R, however that region need not be circular or even have a simple uniform boundary. Thus, regardless of the shape of the region whose perimeter defines the geofence 30, that region may be associated with a location, such as a building 53. Also, the radio transmitter may have its own link 63 to the communication network 70. The communication network 70 may include switching centers 73 that may be coupled through in-network connections 75 to server(s) 77 for data processing, retrieval and collection. The communication network 70 may also further communicate with the tracking device 5 using cellular, Wi-Fi, Bluetooth and other means of communication. In the various embodiments, the wireless tracking device 5 may include one or more processors, antennas and memory that enable the device to execute algorithms for operating the GPS engine and related tracking device applications.

In an embodiment, in order to minimize and/or reduce energy consumption, under challenging GPS conditions it may be assumed the tracking device no longer demands high accuracy for a GPS fix, so the device may be set to operate using a low QoS. Otherwise, if the device remains in challenging conditions for a prolonged period, but continues to regularly attempt to get a GPS fix with a high TTF, the device battery life may be significantly reduced. Challenging GPS conditions may exist because there is no GPS coverage in the area where the tracking device is operating. Under such conditions the GPS engine may attempt to yield a fix for a period no longer than a designated QoS without producing any GPS fix. Thus, if the GPS engine does not yield a GPS fix in the designated period, such a circumstance may be considered a challenging GPS condition. Another example of challenging GPS conditions includes a multi-path presence, where the GPS engine needs a long TTF, longer than a predetermined threshold period, to yield a GPS fix. While, multi-path presence fixes may be characterized by low accuracy and average uncertainty, they may nonetheless be considered challenging GPS conditions. In accordance with an embodiment herein, the actual TTF may be used to determine whether a device is experiencing challenging GPS conditions. Accordingly, a long TTF may be associated with challenging GPS conditions, such as when a user is indoors and not standing near a window.

Figure 2:
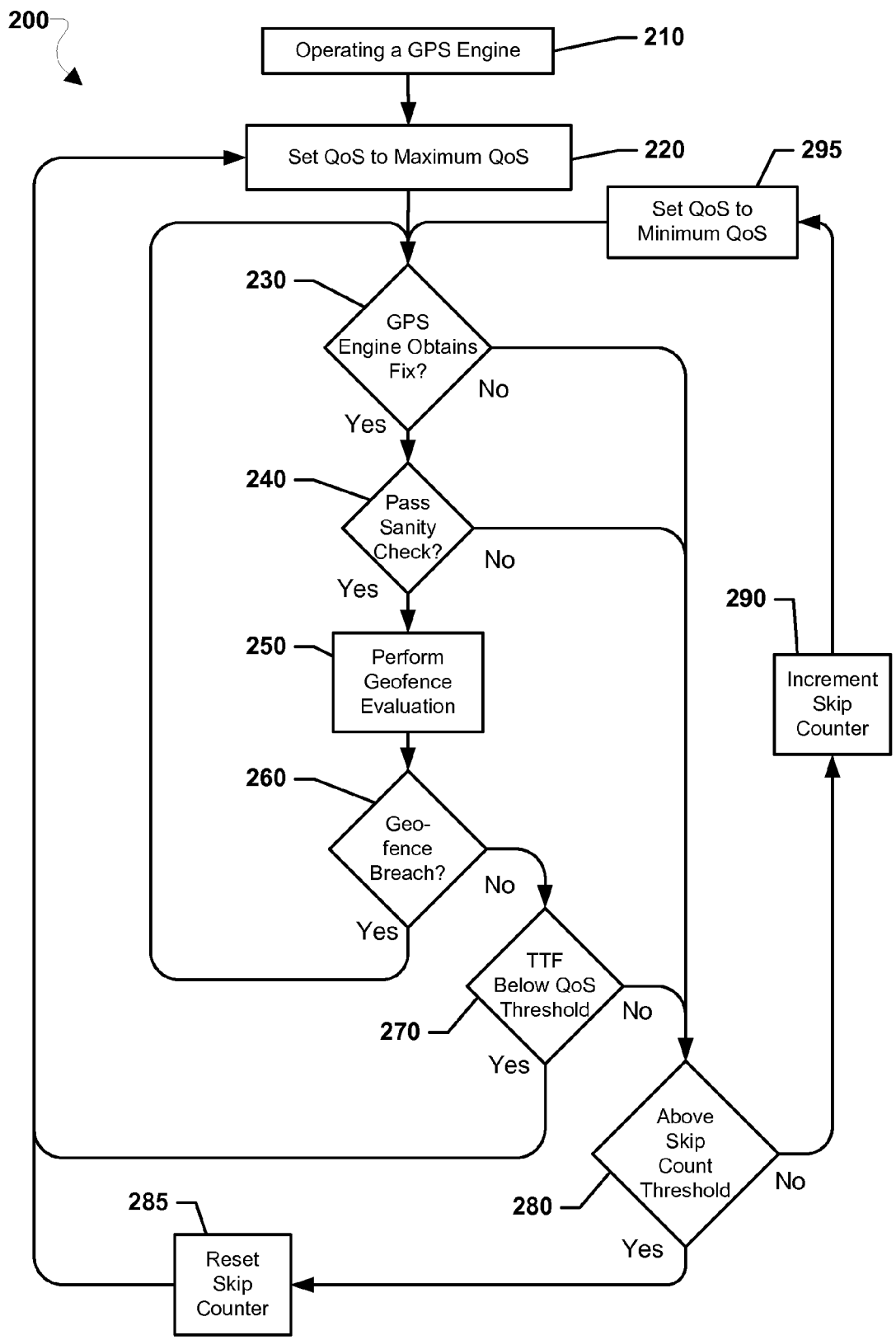
FIG. 2 is a process flow diagram illustrating an embodiment method of operating a GPS engine suitable for the various embodiments.

FIG. 2 illustrates an embodiment method 200 for operating a GPS engine for geofence applications. In an embodiment, the operations of method 200 may be performed by one or more processors and a GPS engine of a tracking device. In block 210 a GPS engine may be operated in an active geofence monitoring state, which corresponds to a state in which the GPS engine actively attempts to yield a GPS fix and evaluate the tracker device position related to the geofence. In an active geofence monitoring state, the GPS engine operates with a preset QoS on the amount of time the GPS engine may remain active attempting to yield a fix and evaluate it against the geofence. Once the allowed QoS is reached, the GPS engine is no longer running, which means it is no longer attempting to yield a fix. In an embodiment, the active geofence monitoring state and its parameters may be pre-provisioned in a memory available to the GPS engine, and the processor of the GPS engine may select the geofence monitoring state, including its QoS, from the memory.

In block 220 the maximum QoS may be already set to a predetermined maximum QoS (ceiling QoS), such as for example 120 seconds. Using the maximum QoS provides the GPS engine the best opportunity to achieve a good fix, if possible, under even very challenging conditions. The time limit corresponding to the maximum QoS may be based on the maximum TTF value generally needed to obtain a fix under a predefined set of conditions. In the context of geofence tracking, a set of predefined conditions that may be useful in this regard corresponds to a typical indoor environment experienced by a GPS engine. An indoor environment as it pertains to yielding a GPS fix need not be the worst case conditions found indoors, which often involves no GPS signal available. Rather, a typical indoor environment where GPS signals may still be obtained may be used for determining the maximum TTF. For example, the conditions typically experienced when inside a building, in the center of a room with a window may be used for determining the maximum QoS.

In determination block 230, a determination may be made as to whether the GPS engine obtained a GPS fix. Such a fix, if it was obtained, will have occurred within the currently set QoS. That currently set QoS may initially be the maximum QoS, but in subsequent cycles the value of the QoS may be set to the maximum or a minimum QoS set in blocks 220/295, discussed below. In an embodiment, a processor of the tracking device may determine and/or set the time value of the maximum or minimum QoS. In another embodiment, a remote server may upload these values to the tracking device for use by the processor. If the GPS engine obtains a fix, both the location of the fix, including the extent of the accuracy and uncertainty regions, as well as the actual time it took to obtain that fix (i.e., the actual TTF) may be stored in memory. If the GPS engine obtains a GPS fix (i.e., determination block 230="Yes"), a sanity check may be performed in determination block 240.

If the GPS engine obtains a fix, that fix may be checked to make sure it is realistic in determination block 240, which is referred to as a "sanity check." For example, a distance threshold may be used, such that if the location of the fix is too far away from the prior fix, it will not be considered realistic and will fail the sanity check. Alternatively, if the GPS fix is associated with too large an uncertainty, it may also fail the sanity check. But, if the GPS fix is considered realistic and thus passes the sanity check (i.e., determination block 240="Yes"), a geofence evaluation may be performed in block 250. The geofence evaluation compiles and analyzes the GPS fix, taking into account its accuracy and uncertainty, in relation to the geofence perimeter. In block 260 a determination may be made as to whether a geofence breach is detected based on the GPS fix and the geofence evaluation. If a geofence breach determination is positive (i.e., determination block 260="Yes"), the process may again operate in the active geofence monitoring state for another GPS fix yield attempt and return to determination block 230 to determine whether a new GPS fix was made. Alternatively, in block 260 if no geofence breach is detected (i.e., determination block 260="No"), in determination block 270 a determination may be made as to whether the actual TTF for that GPS fix is below a predetermined quality of service (QoS) threshold. The QoS threshold corresponds to a detection threshold for identifying challenging GPS conditions. The QoS threshold may be based on a statistical average TTF value needed to obtain a fix under a predefined set of conditions. For example, the QoS threshold may correspond to a statistical average time value needed to obtain a fix in a common indoor environment, such as in the middle of a room with a window. In the context of geofence tracking, once again the typical indoor environment experienced by a GPS engine may be used to establish this value. If that actual TTF is below the QoS threshold (i.e., determination block 270="Yes"), the process may again operate in the active geofence monitoring state for another GPS fix yield attempt and return to determination block 230 to determine whether a new GPS fix was made. Determinations at block 230 may be initiated immediately or after a predetermined delay interval.

If it is determined the GPS engine did not yield a GPS fix (i.e., determination block 230="No"), this may be considered challenging GPS conditions and in determination block 280 a skip count determination may be made. Alternatively, if it is determined the GPS engine did yield a GPS fix (i.e., determination block 230="Yes"), a sanity check may be performed in block 240 to make sure the acquired fix is realistic. Not passing the sanity check (i.e., determination block 240="No") is treated similar to when the GPS did not yield a fix, and may also be considered challenging GPS conditions, such that in determination block 280 a skip count determination may be made. As yet a further alternative, even where the GPS engine did obtain a fix in block 230, passed the sanity check in block 240 and no geofence breach was determined in block 260 (i.e., determination block 260="No"), if the actual TTF for the GPS fix obtained in block 230 meets or exceeds the QoS threshold (i.e., determination block 270="No"), this may further be considered challenging GPS conditions, so a skip count determination may be made in block 280.

A skip count determination may be made in block 280, which checks what number of prior GPS yield determination attempts have been made under so-called "challenging GPS conditions," and particularly those using the minimum QoS. The skip counter may keep track of the number of cycles under which the tracking device has used the minimum QoS after challenging conditions were detected. In this way, the skip count tracks the number of prior times the GPS engine was set to operate in the active geofence monitoring state for no more than a particular QoS period, such as the minimum QoS period. Also, the skip count may be used to allow the GPS engine to attempt a GPS fix, with the QoS set to the predetermined maximum, every once in a while in order to check whether the GPS environment has changed. The number of cycles designated for the skip count threshold in determination block 280 may generally control how long the period is before the GPS engine is made to check for new conditions using the higher QoS.

If the skip count is not above that skip count threshold (i.e., determination block 280="No"), in block 290 the skip counter is incremented and in block 295 the GPS engine is set to operate no longer than for a predetermined minimum QoS, such as for example 35 seconds. The time limit corresponding to the minimum QoS may be based on the minimum amount of time generally needed to obtain a fix under a predefined set of conditions, which corresponds to a minimum run-time of the GPS engine. In the context of geofence tracking, a set of predefined conditions that may be useful in this regard corresponds to a typical outdoor urban environment experienced by a GPS engine. The predefined conditions for the minimum QoS may be chosen to minimize power consumption in challenging GPS environments and still provide enough time to obtain a GPS fix in average conditions. An outdoor urban environment is one example of average conditions, but other may be used to determine this value. An outdoor environment as it pertains to yielding a GPS fix in this regard need not be the best or worst case conditions found outdoors. The GPS engine may again operate in the active geofence monitoring state for another GPS fix yield attempt and return to determination block 230 to determine whether a new GPS fix was made.

Alternatively, if the skip count is above the skip count threshold (i.e., determination block 280="Yes"), this means the requisite number of cycles have occurred and it is time to let the GPS engine check to see whether the GPS conditions have changed using the higher QoS. Thus, in block 285 the skip counter is reset to zero. With the QoS set to the predetermined maximum, the GPS engine may continue to operate and attempt another GPS fix, returning to determination block 230. This higher QoS may allow the system to determine whether the previously detected challenging GPS conditions still exist.

Figure 3:
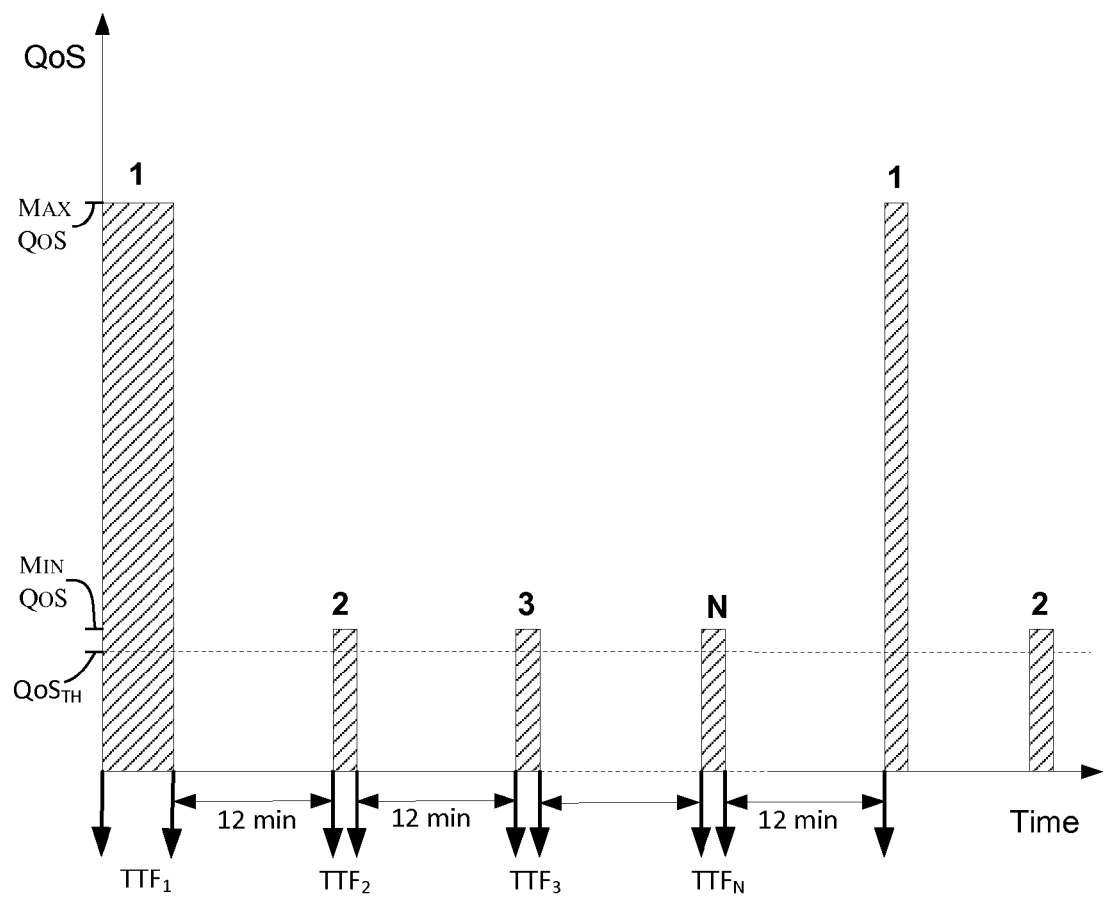
FIG. 3 is a graph illustrating a QoS pattern suitable for use in the various embodiments.

FIG. 3 illustrates a pattern example for QoS in accordance with the various embodiments. The horizontal axis of the graph represents a progression of actual time from left to right. The vertical axis represents a level of the QoS to which the GPS engine is set in attempting a GPS fix. Each bar on the graph represents a period during which a GPS fix attempt occurs. Above each bar on the graph is a skip counter value, which is shown as being incremented as a result of that bar representing a tracking device experiencing challenging GPS conditions. An initial maximum QoS is set to a high level corresponding to a maximum value for the QoS. Such a maximum QoS may be determined in a customized way for a particular tracking device, predetermined in a memory or set by a server. Also, as noted above and explained more fully below with regard to FIG. 6, this maximum QoS may be optimized to provide an acceptable GPS fix in almost any environment where a GPS fix is possible. For example the maximum QoS may be 60 seconds. The first GPS fix attempt is shown as lasting for a period of time indicated as $TTF_1$, which value for purposes of this example may be considered well above a QoS threshold ($QoS_{TH}$). As described above, a longer than desirable actual TTF may be considered challenging GPS conditions. Thus, in accordance with an embodiment the skip counter may be incremented from 0 to 1 (as indicated at the top of the first bar) and the next GPS fix may use a QoS set to a minimum QoS. The use of a lower QoS will conserve energy. The minimum QoS may be set slightly higher than the $QoS_{TH}$, so it may still obtain a fix, for example set to 35 seconds. Also, as explained more fully below with regard to FIG. 7, this minimum QoS may be optimized to provide minimum energy consumption in challenging GPS environments, while still providing enough time to acquire signals in average outdoor urban environments. The next GPS fix determination has a preset delay of 12 minutes, but after the skip counter is checked and the skip count incremented to 2, the next GPS fix will also use the minimum QoS. As shown, once again the next GPS fix determination has a preset delay of 12 minutes, but after the skip counter is checked and the skip count incremented to 3, the next GPS fix will also use the minimum QoS. This cycle will continue so the QoS is only changed if challenging GPS conditions are detected or the skip count reaches N. In this way, N is the maximum number of GPS fixes allowed to use a QoS after challenging GPS conditions are detected. Thus, if the skip count threshold is 10 for example, then after the $10^{th}$ cycle, the skip counter is reset and the QoS is set to the predetermined maximum QoS. Under further challenging GPS conditions, the next GPS fix will use the minimum QoS and the cycles repeat. Use of a minimum QoS may reduce power consumption and the skip counter allows the tracking device to sense the GPS environment at least every (N+1) *12 minutes.

Some tracking device applications use GPS fixing in conjunction with one or more geofences. As used herein, a geofence is a virtual perimeter or boundary for a real-world geographic area. The geofence 30 illustrated in FIG. 1, FIG. 4 and FIG. 5 may be considered a geofence. The geofence may be dynamically generated and/or include a predefined set of boundaries. A geofence may be a radius R around a building or point location. Alternatively, a geofence may be non-circular region such as a predefined set of boundaries, like the perimeter of a structure, school attendance zones or neighborhood boundaries. Also, a geofence may have an irregular shape.

Tracking device applications that use geofences may monitor movement of one or more targets, such as personal assets, vehicles or personnel, within a particular geofence.

The geofence may be used to track and record the entry and exit of the assigned target from that geographic boundary. Thus, a geofence application focuses on determinations of whether the target is inside the geofence or outside. The target may be carrying/wearing a tracking device, which may be a tag specifically for tracking or even a device such as a cellular telephone that has other uses, in order to locate the target. In this way, the various embodiments may further include a geofence evaluation as another consideration for the QoS adjustments based on GPS conditions. If a tracking device is inside a geofence, the device may benefit from using a low level QoS, with its associated lower level of battery consumption, since its location is already defined by the geofence. When the GPS fix subsequently places the tracking device outside the geofence, the device may start using a higher QoS, even though it is associated with higher battery consumption, presumably because higher accuracy may be desired. geofence applications may be less sensitive (in detecting the geofence state change) to low quality GPS fixes if the QoS is too low since they often result in low false alarm and high miss detection rates. A false alarm (FA) means a breach event is detected, yet in reality there is no breach. A miss detection (MD) means a breach exists, but it is not detected as a breach event. Thus, a more refined adjustment of the QoS may be desirable in some applications, such as geofence applications. The adjustment of the QoS may balance battery consumption versus the false alarm rates.

Figure 4:
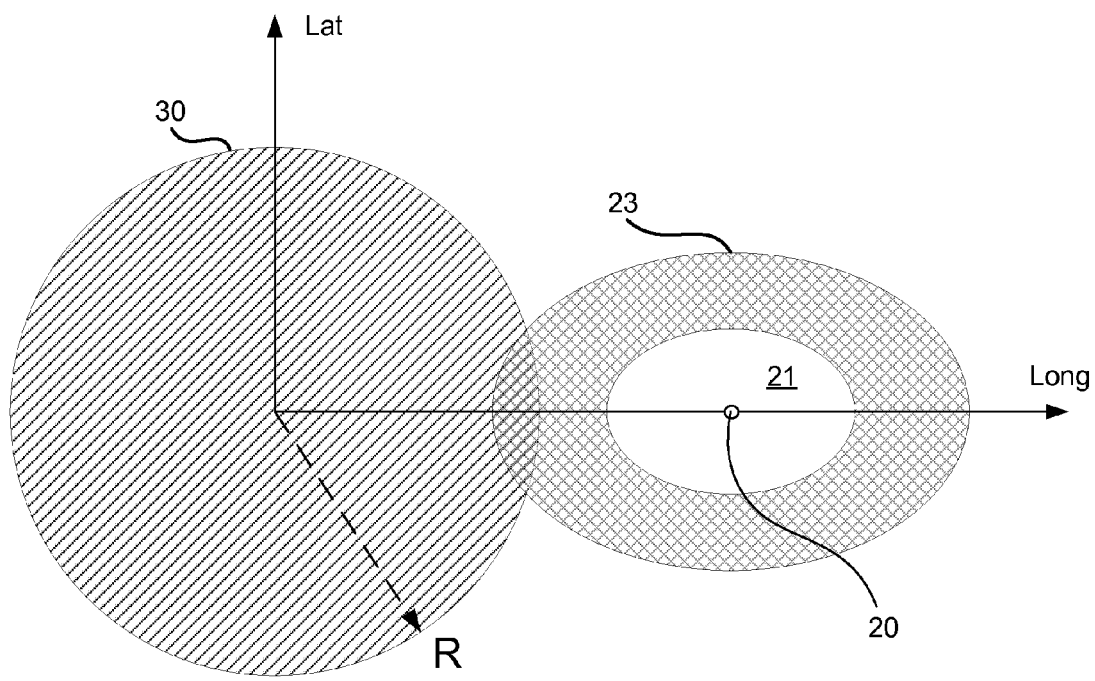
FIG. 4 is a plan view diagram illustrating an uncertainty region of a GPS fix overlapping with a geofence boundary, suitable for use in the various embodiments.
Figure 5:
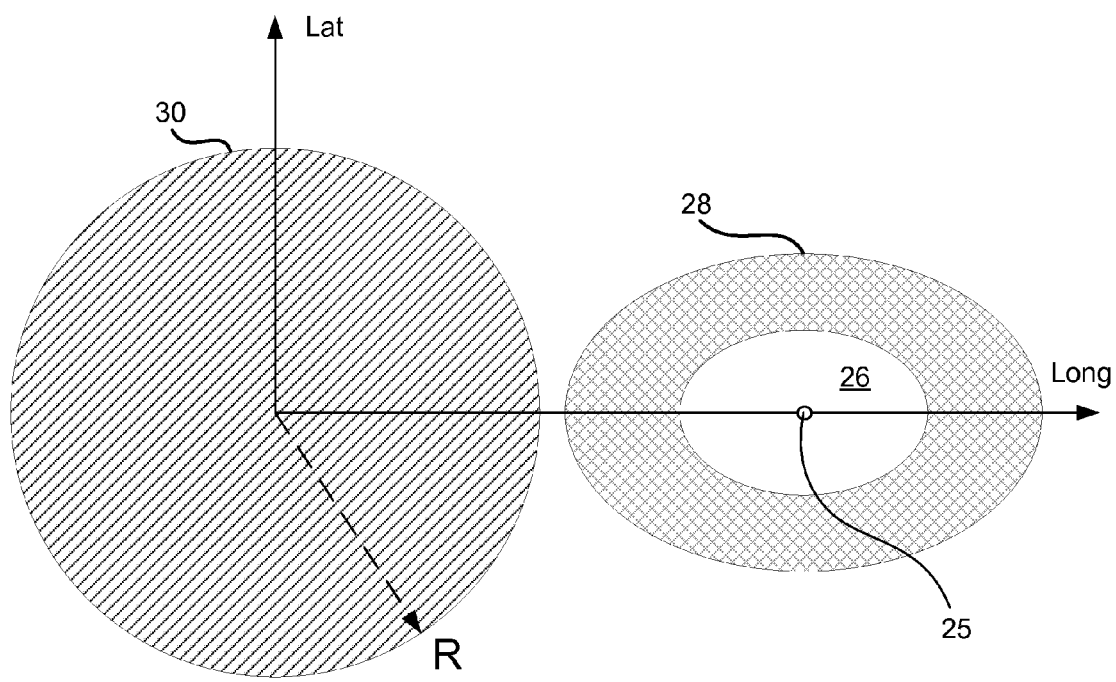
FIG. 5 is a plan view diagram illustrating a geofence breach of a GPS fix relative to a geofence boundary, suitable for use in the various embodiments.

FIGS. 4 and 5 illustrate aspects of GPS fixing, as well as how a geofence application may use and/or interact with GPS fixing in accordance with the various embodiments. A GPS fix 20, 25 is shown with an associated region of accuracy (also referred to as the "accuracy region") 21, 26 represented by an ellipsoid. Also, each GPS fix 20, 25 may generally be characterized by a region of uncertainty (also referred to as an "uncertainty region" 23, 28 that extends beyond the accuracy region 21, 26. FIGS. 4 and 5 also show a geofence 30, having a radius R. The points of interest are defined by a designated virtual boundary surrounding a location, also referred to as a geofence 30. In the illustrative examples of FIG. 4 and FIG. 5 a radius R from a center of the location defines that boundary of the geofence. Thus, by defining a geofence, applications may use determinations regarding whether that virtual boundary has been breached, meaning a determination may be made with a particular level of certainty that the GPS fix places the device outside that geofence.

The determination that a breach has occurred (a "breach event") may be reserved for when even the uncertainty region 23, 28 no longer overlaps with the geofence region 30. Thus, FIG. 4 represents a situation with one GPS fix 20 where no breach has occurred since the uncertainty region 23 overlaps the geofence 30. In contrast, FIG. 5 represents a situation with another GPS fix 25 where a breach event has occurred since there is no overlap between the uncertainty region 28 and the geofence 30. Alternatively, a threshold distance may be required between the uncertainty region 28 and the geofence before it is considered a breach event. As yet a further alternative, a breach event may be declared when the accuracy region 21, 26 no longer overlaps with the geofence 30 or a threshold distance between the accuracy region 21, 26 and the geofence 30. It may be expected that lowering the QoS will in-turn lower the GPS fix quality in terms of accuracy and uncertainty but without affecting the geofence cross-detection decision as well as the user experience.

GPS engine performance relative to a breach event in a geofence application tends to show an increase of reported breaches as the target starts from the center point of the geofence and progressively makes its way to points outside the geofence. The inverse of that trend may be seen as a decrease of non-breaches that go unreported. In other words, as the target moves from the center point of the geofence toward points outside the geofence, fewer instances go unreported. The breaches reported when the target is in fact still inside the geofence are considered false alarms, while the reported breaches when the target is outside the geofence are correct hits. The non-breaches that properly go unreported are considered correct rejections. A correct rejection means the target is inside the geofence and thus no breach should have been reported. However, when the target actually is outside the geofence but no breach is reported it is considered a missed detection. Beyond a certain distance past the geofence, the QoS becomes less and less significant for geofence applications to correctly report breaches. However, QoS may be important for tracking applications, so the maximum QoS may be maintained when the tracker is well outside the geofence in good GPS conditions. Also, when the GPS engine does not face challenging GPS conditions the false alarm rate may not vary much depending on the QoS used. However, under challenging GPS conditions the false alarm rate is almost the same using the minimum QoS. That is because the uncertainty region is larger and compensates for false alarms. The MD rate is not affected because the likelihood of having a breach in indoor environment is very low. Accordingly, the determination as to the minimum QoS used for tracking applications using geofence may need to balance the need to reduce battery consumption versus the desire to maintain false alarms low.

Figure 6:
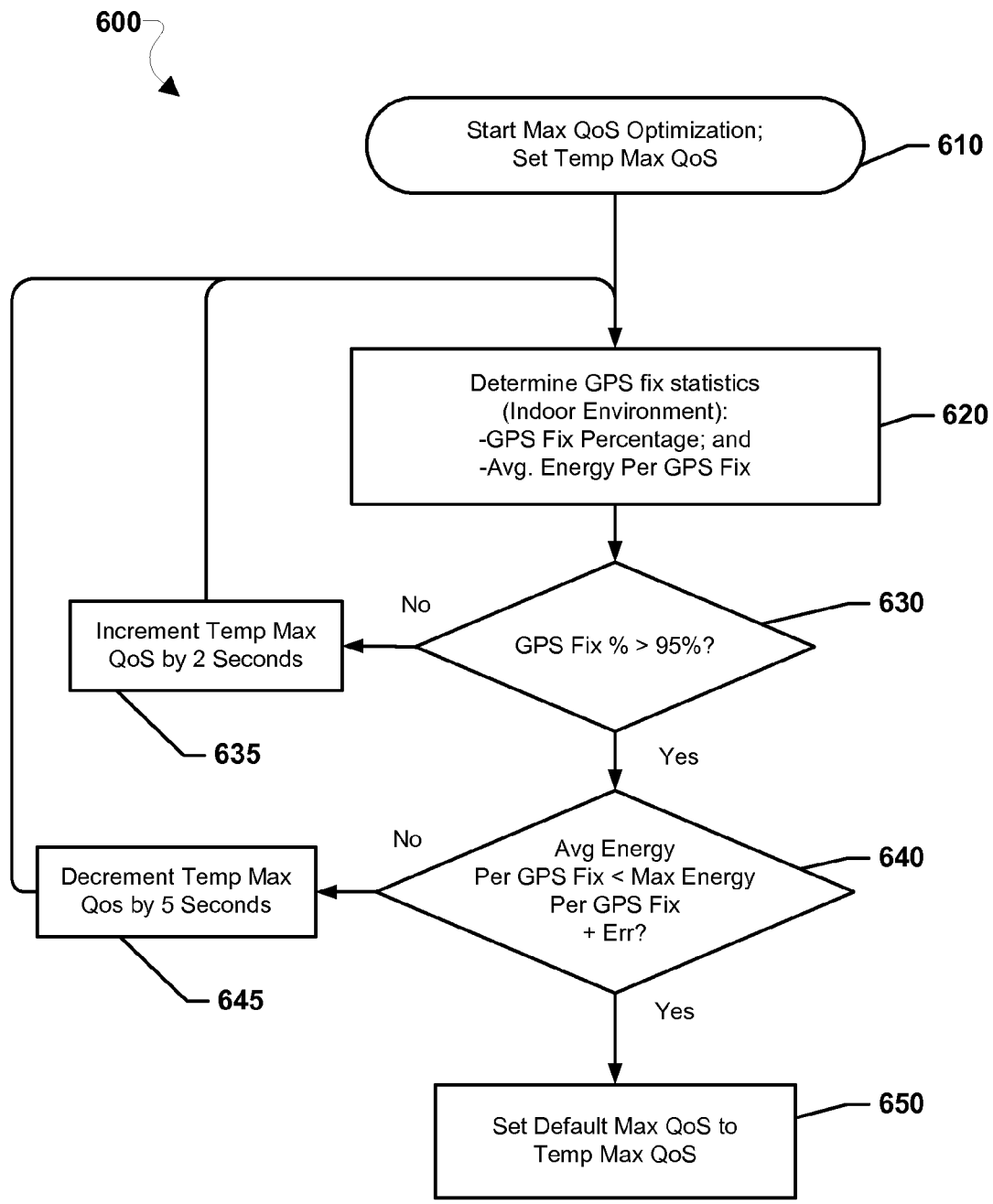
FIG. 6 is a process flow diagram illustrating an embodiment method of determining a maximum QoS suitable in the various embodiments.

FIG. 6 illustrates an embodiment method 600 for optimizing a value for the maximum QoS. In an embodiment, the operations of method 600 may be performed by the processor of a GPS engine in a tracking device. In block 610 the optimization method may be initiated. Also, the maximum QoS may be temporarily set to an estimated maximum value, based on historical GPS engine performance. For example, 120 seconds may be used as the estimated maximum. In block 620, GPS fix statistics may be determined for a number of GPS fix attempts. In an embodiment, an indoor environment may be used for the determination of GPS fix statistics, rather than open-sky conditions. Those statistics may be compiled specifically for the method 600 or based on historical statistics maintained by the GPS engine. Such statistics may determine a percentage of GPS fixes obtained and an average energy consumption per fix, both using the temporary maximum QoS. While initially that temporary maximum QoS may be the default value, such as 120 seconds, in subsequent cycles of the method 600 that temporary value may be adjusted. In block 630 a determination may be made as to whether the percentage of fixes obtained using the temporary Maximum Qos is greater than 95%. If not (i.e., determination block 630 is "No"), the temporary maximum QoS may be incremented by 2 seconds and the process may return to block 620 to determine GPS fix statistics using the new temporary maximum QoS. If the percentage of GPS fixes exceed 95% (i.e., determination block 630 is "Yes"), a determination may be made in block 640 as to whether the average energy consumption per GPS fix is less than a maximum allowed energy per GPS fix. The determination in block 630 may also factor-in an acceptable energy error (Err) added to the maximum allowed energy per GPS fix for the algorithm to converge on a result more reliably. The Err value may be used for convergence in the algorithm and may be less that 5% of the average energy spend to get a GPS fix. If the average energy per GPS fix is not less than the maximum allowed energy per GPS fix (i.e., determination block 640 is "No"), the temporary maximum QoS may be decreased by 5 seconds and the process may return to block 620 to determine GPS fix statistics using the new temporary maximum QoS. If the average energy per GPS fix is less than the maximum allowed energy per GPS fix (i.e., determination block 640 is "Yes"), in block 650 the temporary maximum QoS from this current cycle of the determination in block 640 is used to set the default maximum QoS for the tracking device.

Figure 7:
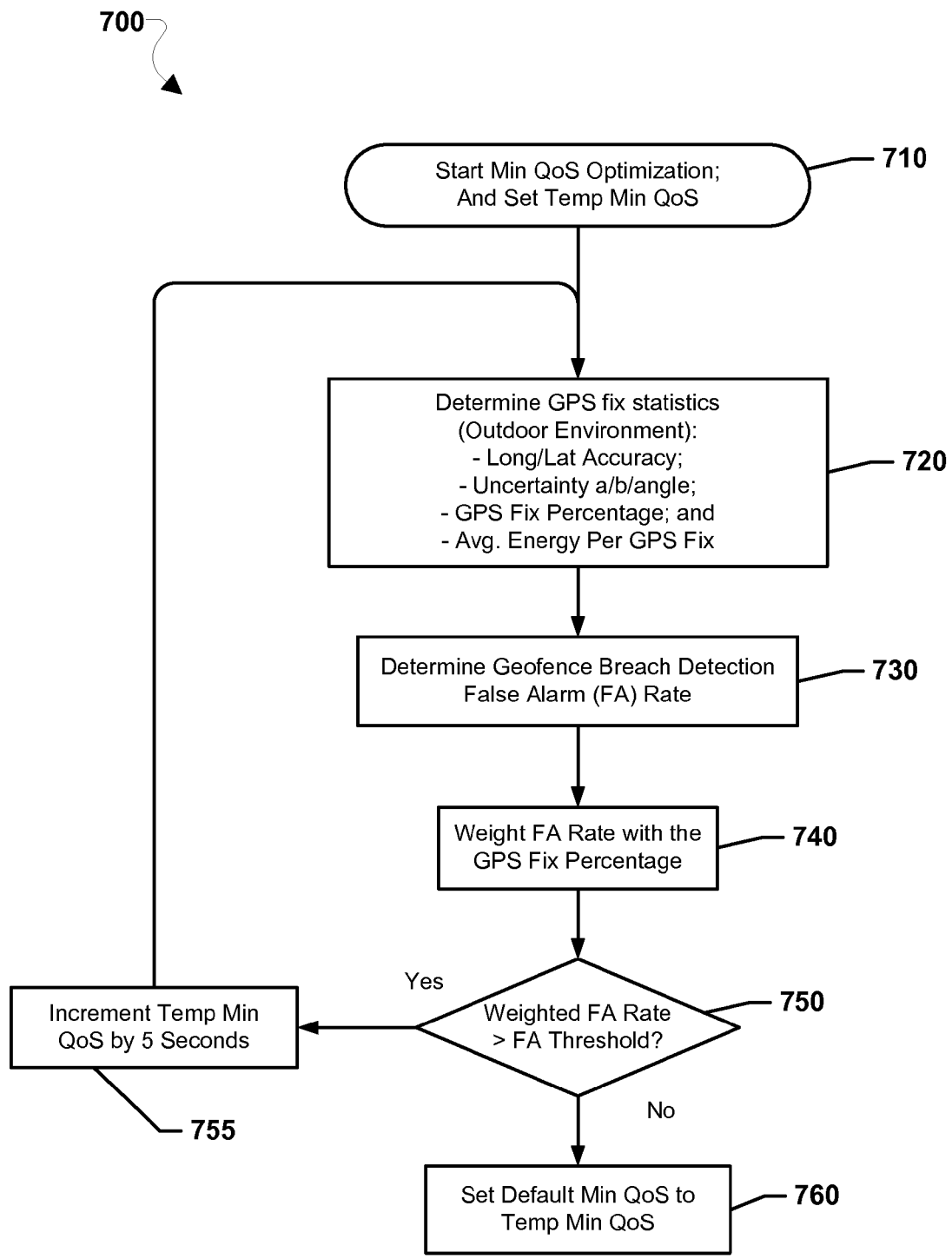
FIG. 7 is a process flow diagram illustrating an embodiment method of determining an optimize max QoS=maximum allowed GPS running time suitable in the various embodiments.

FIG. 7 illustrates a process flow of an embodiment method 700 for optimizing a value for the minimum QoS. In an embodiment, the operations of method 700 may be performed by the processor of a GPS engine in a tracking device. In block 710 the optimization may be initiated and the minimum (Min) QoS may be temporarily set to an estimated minimum value, based on historical GPS engine performance. For example, 15 seconds may be used as the estimated minimum. In block 720, GPS fix statistics may be determined for a number of GPS fix attempts. In an embodiment, an average outdoor environment may be used for the determination of GPS fix statistics, in order to preserve the fix quality in outdoor environments. In this way, in an outdoor environment, the GPS fix quality may be the same for both QoS=120 seconds and QoS=minimum QoS. Those statistics may be compiled specifically for the method 700 or based on historical statistics maintained by the GPS engine. Such statistics may determine a percentage of GPS fixes obtained using the temporary minimum QoS. Additionally, the statistics may include a longitudinal and latitudinal accuracy, the uncertainty (a, b and angle) and an average energy consumption per fix, applying the temporary minimum QoS. While initially that minimum QoS may be a default value, such as 15 seconds, in subsequent cycles of the method 700 that temporary value may be adjusted. In block 730 a determination may be made as to the rate at which false alarms are generated based on improper geofence breach determinations. Based on the GPS fix accuracy, uncertainty and position relative to the geofence, breach determinations are made. However, a certain percentage may be geofence breach false alarms (FA's), meaning the device was still inside the geofence yet a breach was detected. In block 740, the geofence breach false alarm rate (FA rate) determined in block 730 may then be weighted, based on the GPS fix yield percentage determined from block 720 to determine a weighted FA rate. In block 750 a determination may be made as to whether the weighted FA rate exceeds a pre-established false alarm threshold ("FA threshold"). An acceptable FA rate may be under 1% of the geofence breach detection rate, and preferably as loss as 0.1% of that rate. Also, a percentage of fixes obtained using the temporary minimum QoS may be greater than 95%. If weighted FA rate does exceed the FA threshold (i.e., determination block 750 is "Yes"), the temporary minimum QoS may be increased by 5 seconds and the process may return to block 720 to determine GPS fix statistics using the new QoS. If weighted FA rate does not exceed the FA threshold (i.e., determination block 750 is "No"), in block 760 the temporary minimum QoS from this current cycle of the determination in block 750 is used to set the default minimum QoS for the tracking device.

Figure 8:
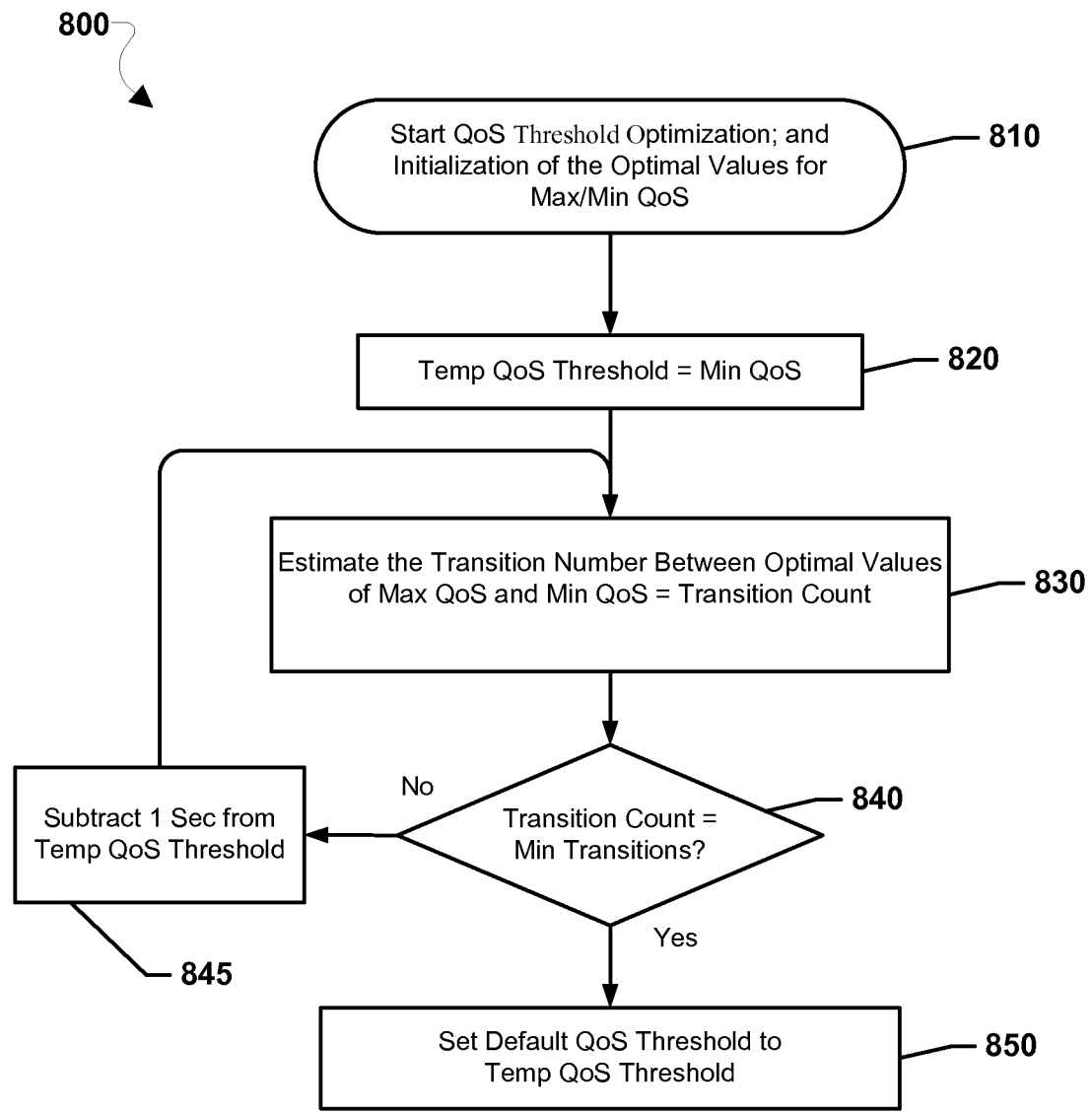
FIG. 8 is a process flow diagram illustrating an embodiment method of determining an optimized Quality of Service Threshold suitable in the various embodiments.

FIG. 8 illustrates a process flow of an embodiment method 800 for optimizing a value for the QoS threshold. In an embodiment, the operations of method 800 may be performed by the processor of a GPS engine in a tracking device. In block 810 the QoS threshold optimization may be initiated and the maximum and minimum optimized QoS are set. The initialization of the maximum and minimum QoS may resort to the methods 600 and 700 described above or may use predetermined values. In block 820 a temporary QoS threshold may be set to the minimum QoS applied in block 810. In block 830, a transition number/count may be estimated based on the optimized values determined for the maximum QoS and the minimum QoS. The transition number refers to the number of cycles the system resets the skip count, as described above. For example 10 transitions out of 100 GPS fixes represents 10% of the total number of fixes and corresponds to a skip count of 10 (i.e., N=10 in FIG. 3). In block 840 a determination may be made as to whether the transition count equals a minimum number of transition allowed for the optimization. Thus, an exemplary acceptable minimum transition number/count may be 10 or 10% of GPS fixes used for the QoS threshold optimization. If the transition count does not equal the minimum number of transitions (i.e., determination block 840 is "No"), the temporary QoS threshold may be decreased by 1 second and the process may return to block 830 to estimate a new transition number/count using the new temporary QoS threshold. If the transition count equals the minimum number of transitions (i.e., determination block 840 is "Yes"), in block 850 the temporary QoS threshold from this current cycle of the determination in block 840 is used to set the default QoS threshold for the tracking device.

It should be understood that for the threshold checks, such as checking whether the QoS threshold or the skip count threshold have been reached, those threshold values may be set as desired. In an embodiment, those threshold values may be pre-provisioned in a memory available to the GPS engine, and the processor of the GPS engine may apply the threshold from the memory. In another embodiment, the GPS engine may receive those threshold values from a server operatively communicating with the GPS engine. Also, while the exemplary threshold checks described above are resolved by a value being below the threshold (i.e., determination blocks 270) such threshold checks may inverted by checking whether that value is above the threshold and having the "yes" and "no" process flow directions switched. Similarly, a threshold check resolved by a value being above the threshold (i.e., determination blocks 280) may be inverted and/or the threshold value and process flow directions adjusted accordingly. Additionally, the skip counter and skip count threshold described above may count up to a number or count down to a number. In this way a skip count that counts up to a number would increase the skip count in blocks 290, while a skip count counting down to a number would decrease the skip count in blocks 290.

Figure 9:
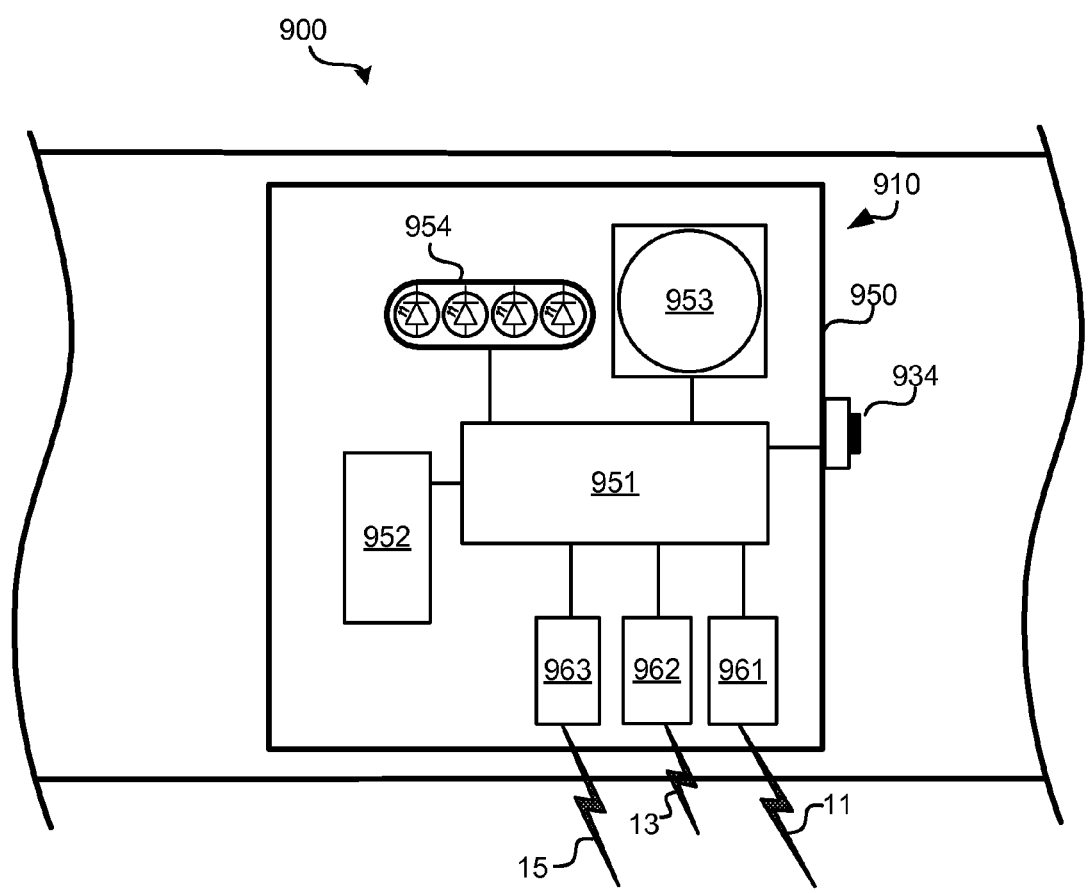
FIG. 9 is a component block diagram of a mobile tracking device that may be used with the various embodiments.

The various embodiments may be implemented in and/or with any of a variety of tracking devices, such as a tracking collar, an example of which is illustrated in FIG. 9. The tracking device 900 includes a housing 910 that houses the electronics of the device, including but not limited to, a transceiver, a processor, a memory, and a battery as described in more detail below. The housing 910 may be waterproof and shock resistant to protect the electronics from the environment. Also, the housing 910 may be made of any suitable material such as plastic, rubber, stainless steel, etc. The housing 910 is configured so that the electronics can be serviced, such that worn or damaged parts may be replaced or repaired. The tracking device 900 may include a tracking circuitry 950 that is sealed within the housing 910. The tracking circuitry 950 may include a processor 951 coupled to memory 952 and a power source, such as a battery 953. In an embodiment, the tracking circuitry 950 may also include one or more light emitting diodes (LED's) 954 that may be used to communicate operational status information. A GPS transceiver 961 may be coupled to the processor 951 and configured to establish a data link 11 with a satellite. A short range radio transceiver 962 may also be coupled to the processor 951 and configured to receive communication signals 13 from RF beacons. A long-range transceiver 963 or high-power radio, such as a cellular data transceiver, may be coupled to the processor 951 and configured to establish a data link 15 with a long-range wireless network, such as a cellular data network.

The tracking circuitry 950 may also include a user input mechanism 934 coupled to the processor 951, such as a button, small keypad or a switch. The processor 951 may be configured with processor-executable instructions to receive user inputs from the input mechanism and interpret the inputs (e.g., button press, entry of a PIN number, movement of a switch, etc.) as control inputs, such as a user input indicative of expected departure of the tracking device from a safe-zone. In an embodiment, the user input mechanism 934 may be an RFID tag or chip that can receive an RFID query signal. The tracking circuitry 950 may also include an induction charging circuit element so that the battery 953 may be recharged by placing the tracking device 900 in close proximity to an induction charging system.

Figure 10:
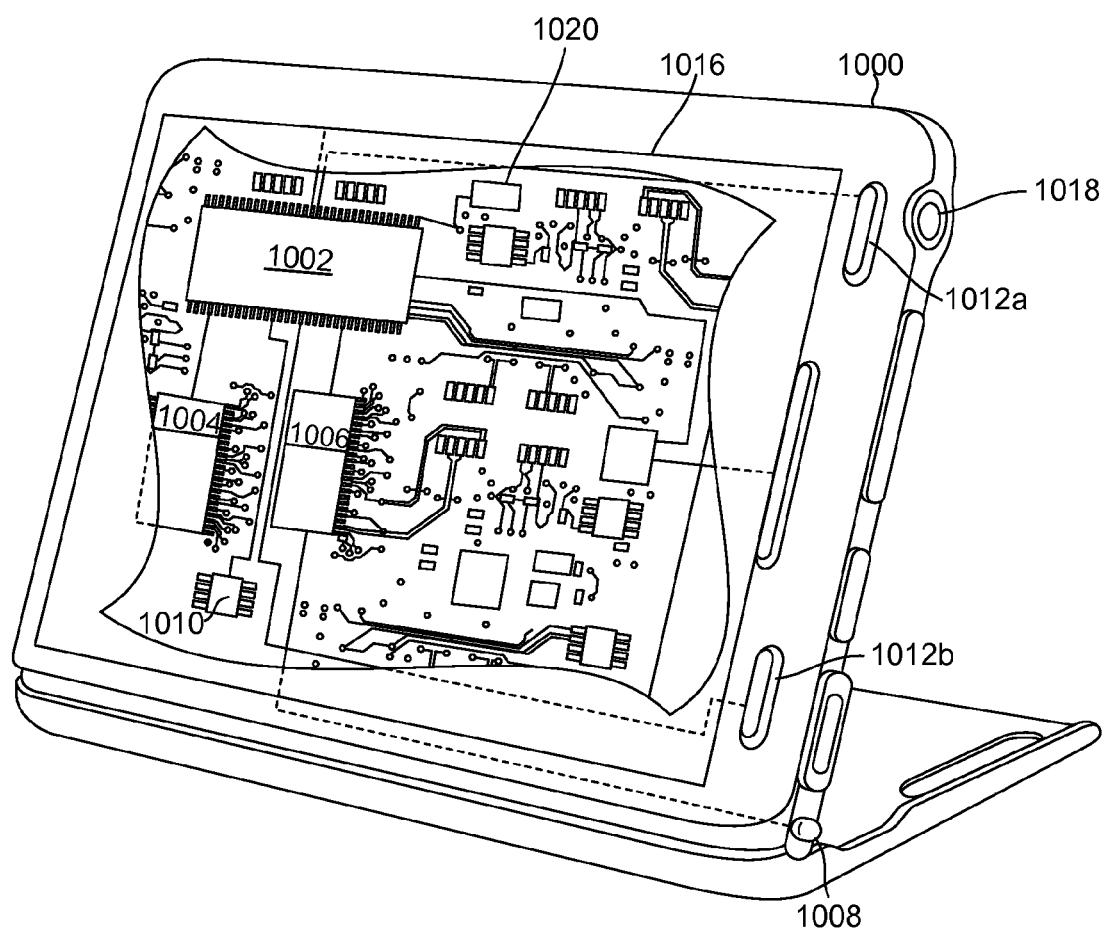
FIG. 10 is a component block diagram of a mobile communication device, in the form of a cellular phone that may be used with the various embodiments.

The various embodiments may be implemented in and/or with any of a variety of wireless tracking devices, such as a mobile communication device including a mobile telephone, a further example of which is illustrated in FIG. 10 in the form of a cellular telephone with a back panel removed. Typical mobile communication devices will have in common the components illustrated in FIG. 10. For example, the mobile communication device 1000 may include a processor 1002 coupled to internal memories 1004 and 1010. Internal memories 1004 and 1010 may be volatile or nonvolatile memories, and may also be secure and/or encrypted memories, or unsecure and/or unencrypted memories, or any combination thereof. The processor 1002 may also be coupled to a user interface, such as a touch screen display 1016 (e.g., a resistive-sensing touch screen, capacitive-sensing touch screen infrared sensing touch screen, or the like), or conventional buttons (e.g., 1012*a* and 1012*b*) and a non-touch screen display. Additionally, the mobile communication device 1000 may include multiple network transceivers configured to enable the processor 1002 to communicate with other computing devices over one or more wired or wireless networks, in accordance with the disclose embodiments. As a particular example, the network transceiver 1006 of a mobile communication device 1000 may include one or more antenna 1008 for sending and receiving electromagnetic radiation that may be connected to one or more wireless data link transceivers and/or network ports 1018 coupled to the processor 1002. The mobile communication device 1000 may also include physical buttons 1012*a* and 1012*b* for receiving user inputs.

The various embodiments may also be implemented in and/or with any of a variety of commercially available electronic devices. Such a laptop computer, which typically includes a processor coupled to volatile memory and a large capacity nonvolatile memory, such as a disk drive. The computer may also include a floppy disc drive, compact disc (CD) or DVD disc drive coupled to the processor. The computer may also include network access ports and antennas coupled to the processor for establishing network interface connections with a network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 11:
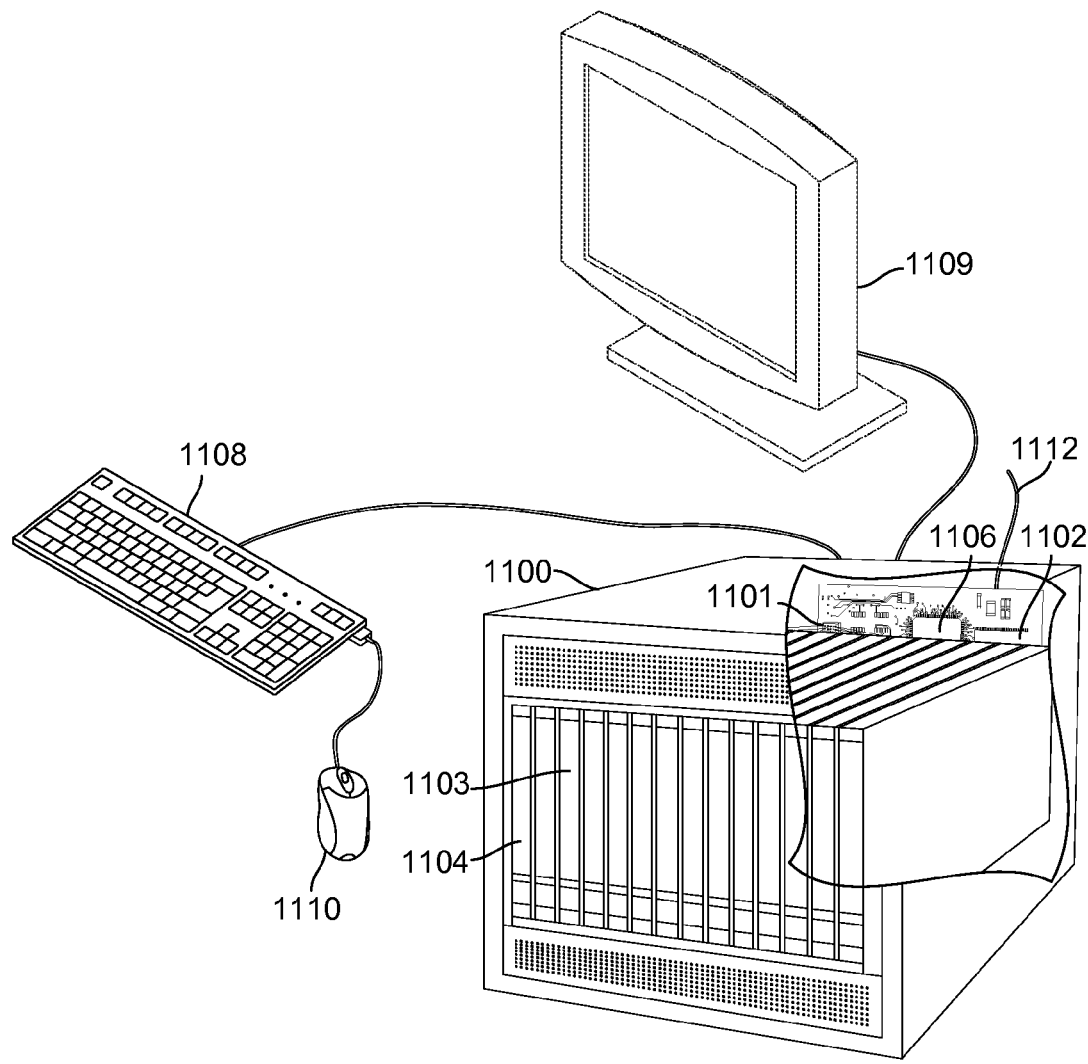
FIG. 11 is a component block diagram of a server that may be used with the various embodiments.

FIG. 11 illustrates an embodiment of a server that may be used with the embodiments discussed above. A server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110, and a display 1109).

The processor 1101 may be any programmable microprocessor, microcomputer or multiple processor chip or chips that can be configured by software instructions (i.e., applications) to perform a variety of functions, including the functions of the various aspects described above. In some devices, multiple processors may be provided, such as one processor dedicated to wireless communication functions and one processor dedicated to running other applications. Typically, software applications may be stored in the internal memory 1102 before they are accessed and loaded into the processor 1101. The processor 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1101 including internal memory or removable memory plugged into the device and memory within the processor 1101.

The processors in the various embodiments described herein may be any programmable microprocessor, microcomputer or multiple processor chip or chips that can be configured by software instructions (applications/programs) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the processor-executable software instructions. In many devices the internal memory may be a volatile or nonvolatile memory, such as flash memory, or a mixture of both. For the purposes of this description, a general reference to memory refers to memory accessible by the processors including internal memory or removable memory plugged into the device and memory within the processor themselves.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order.

Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. The word "exemplary" is used herein to mean "serving as an example, instance, or illustration." Any implementation described herein as "exemplary" is not necessarily to be construed as preferred or advantageous over other implementations.

The various illustrative logical blocks, modules, circuits, and process flow diagram blocks described in connection with the embodiments may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer readable storage medium or non-transitory processor-readable storage medium. The steps of a method or algorithm may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of operating a global positioning system (GPS) engine, comprising:
    operating, by a processor of a wireless tracking device, the GPS engine in an active geofence monitoring state for no more than a first quality of service (QoS) period to obtain a first GPS fix;
    determining, by the processor, whether the GPS engine obtained the first GPS fix;
    setting, by the processor, the GPS engine to operate in the active geofence monitoring state for no more than a second QoS period to obtain a second GPS fix in response to determining the first GPS fix was not obtained, wherein the second QoS period is less than the first QoS period;
    determining, by the processor, whether a geofence breach is detected in response to determining the GPS engine obtained the first GPS fix;
    setting, by the processor, the GPS engine to operate in the active geofence monitoring state for no more than the second QoS period to obtain the second GPS fix in response to determining the geofence breach is not detected; and
    operating, by the processor, the GPS engine in the active geofence monitoring state to obtain the second GPS fix.

2. The method of claim 1, further comprising operating the GPS engine to obtain the second GPS fix for no more than the first QoS period in response to determining the geofence breach is detected.

3. The method of claim 2, further comprising:
    determining a first actual time-to-fix in response to determining the GPS engine obtained the first GPS fix; and
    setting the GPS engine to operate in the active geofence monitoring state for no more than the second QoS period to obtain the second GPS fix in response to determining the first actual time-to-fix is not below a QoS threshold.

4. The method of claim 3, further comprising operating the GPS engine to obtain the second GPS fix for no more than the first QoS period in response to determining the first actual time-to-fix is below the QoS threshold.

5. The method of claim 3, wherein the QoS threshold corresponds to a statistical average time value needed to obtain a fix in a common indoor environment.

6. The method of claim 1, further comprising:
    determining a skip count of a number of prior times the GPS engine was set to operate in the active geofence monitoring state for no more than the second QoS period; and
    setting the GPS engine to operate in the active geofence monitoring state for no more than the second QoS period to obtain the second GPS fix and incrementing the skip count in response to determining the skip count is not above a skip count threshold.

7. The method of claim 6, further comprising operating the GPS engine to obtain the second GPS fix for no more than the first QoS period in response to determining the skip count is above the skip count threshold and the skip count may be reset.

8. The method of claim 1, wherein the geofence breach is determined when a region of uncertainty corresponding to a location of the first GPS fix does not overlap a geofence region associated with the GPS engine, wherein the region of uncertainty extends beyond a region of accuracy corresponding to the location of the first GPS fix.

9. The method of claim 1, wherein the first QoS period corresponds to a maximum duration of a run-time of the GPS engine needed to obtain a fix in an indoor environment corresponding to at least a 95 percent yield rate.

10. The method of claim 1, wherein the second QoS period corresponds to a minimum run-time of the GPS engine needed to obtain a fix and maintain a geofence breach false alarm rate below a false alarm threshold.

11. A wireless tracking device comprising:
a global positioning system (GPS) engine; and
a processor configured with processor-executable instructions to perform operations comprising:
operate the GPS engine in an active geofence monitoring state for no more than a first quality of service (QoS) period to obtain a first GPS fix;
determine whether the GPS engine obtained the first GPS fix;
set the GPS engine to operate in the active geofence monitoring state for no more than a second QoS period to obtain a second GPS fix in response to determining the first GPS fix was not obtained, wherein the second QoS period is less than the first QoS period;
determine whether a geofence breach is detected in response to determining the GPS engine obtained the first GPS fix;
set the GPS engine to operate in the active geofence monitoring state for no more than the second QoS period to obtain the second GPS fix in response to determining the geofence breach is not detected; and
operate the GPS engine in the active geofence monitoring state to obtain the second GPS fix.

12. The wireless tracking device of claim 11, wherein the processor is configured with processor-executable instructions to perform operations further comprising:
operate the GPS engine to obtain the second GPS fix for no more than the first QoS period in response to determining the geofence breach is detected.

13. The wireless tracking device of claim 12, wherein the processor is configured with processor-executable instructions to perform operations further comprising:
determine a first actual time-to-fix in response to determining the GPS engine obtained the first GPS fix; and
set the GPS engine to operate in the active geofence monitoring state for no more than the second QoS period to obtain the second GPS fix in response to determining the first actual time-to-fix is not below a QoS threshold.

14. The wireless tracking device of claim 13, wherein the processor is configured with processor-executable instructions to perform operations further comprising:
operate the GPS engine to obtain the second GPS fix for no more than the first QoS period in response to determining the first actual time-to-fix is below the QoS threshold.

15. The wireless tracking device of claim 13, wherein the processor is configured with processor-executable instructions to perform operations such that the QoS threshold corresponds to a statistical average time value needed to obtain a fix in a common indoor environment.

16. The wireless tracking device of claim 11, wherein the processor is configured with processor-executable instructions to perform operations further comprising:
determine a skip count of a number of prior times the GPS engine was set to operate in the active geofence monitoring state for no more than the second QoS period; and
set the GPS engine to operate in the active geofence monitoring state for no more than the second QoS period to obtain the second GPS fix and incrementing the skip count in response to determining the skip count is not above a skip count threshold.

17. The wireless tracking device of claim 16, wherein the processor is configured with processor-executable instructions to perform operations further comprising:
operate the GPS engine to obtain the second GPS fix for no more than the first QoS period in response to determining the skip count is above the skip count threshold and the skip count may be reset.

18. The wireless tracking device of claim 11, wherein the processor is configured with processor-executable instructions to perform operations such that the geofence breach is determined when a region of uncertainty corresponding to a location of the first GPS fix does not overlap a geofence region associated with the GPS engine, wherein the region of uncertainty extends beyond a region of accuracy corresponding to the location of the first GPS fix.

19. The wireless tracking device of claim 11, wherein the processor is configured with processor-executable instructions to perform operations such that the first QoS period corresponds to a maximum duration of a run-time of the GPS engine needed to obtain a fix in an indoor environment corresponding to at least a 95 percent yield rate.

20. The wireless tracking device of claim 11, wherein the processor is configured with processor-executable instructions to perform operations such that the second QoS period corresponds to a minimum run-time of the GPS engine needed to obtain a fix and maintain a geofence breach false alarm rate below a false alarm threshold.

21. A wireless tracking device with a global positioning system (GPS) engine, comprising:
means for operating the GPS engine in an active geofence monitoring state for no more than a first quality of service (QoS) period to obtain a first GPS fix;
means for determining whether the GPS engine obtained the first GPS fix;
means for setting the GPS engine to operate in the active geofence monitoring state for no more than a second QoS period to obtain a second GPS fix in response to determining the first GPS fix was not obtained, wherein the second QoS period is less than the first QoS period;
means for determining whether a geofence breach is detected in response to determining the GPS engine obtained the first GPS fix;
means for setting the GPS engine to operate in the active geofence monitoring state for no more than the second QoS period to obtain the second GPS fix in response to determining the geofence breach is not detected; and means for operating the GPS engine in the active geofence monitoring state to obtain the second GPS fix.

22. The wireless tracking device of claim 21, further comprising means for operating the GPS engine to obtain the second GPS fix for no more than the first QoS period in response to determining the geofence breach is detected.

23. The wireless tracking device of claim 22, further comprising:
means for determining a first actual time-to-fix in response to determining the GPS engine obtained the first GPS fix; and
means for setting the GPS engine to operate in the active geofence monitoring state for no more than the second QoS period to obtain the second GPS fix in response to determining the first actual time-to-fix is not below a QoS threshold.

24. The wireless tracking device of claim 23, further comprising means for operating the GPS engine to obtain the second GPS fix for no more than the first QoS period in response to determining the first actual time-to-fix is below the QoS threshold.

25. The wireless tracking device of claim 23, wherein the QoS threshold corresponds to a statistical average time value needed to obtain a fix in a common indoor environment.

26. The wireless tracking device of claim 21, further comprising:
means for determining a skip count of a number of prior times the GPS engine was set to operate in the active geofence monitoring state for no more than the second QoS period; and
means for setting the GPS engine to operate in the active geofence monitoring state for no more than the second QoS period to obtain the second GPS fix and incrementing the skip count in response to determining the skip count is not above a skip count threshold.

27. The wireless tracking device of claim 26, further comprising means for operating the GPS engine to obtain the second GPS fix for no more than the first QoS period in response to determining the skip count is above the skip count threshold and the skip count may be reset.

28. The wireless tracking device of claim 21, wherein the geofence breach is determined when a region of uncertainty corresponding to a location of the first GPS fix does not overlap a geofence region associated with the GPS engine, wherein the region of uncertainty extends beyond a region of accuracy corresponding to the location of the first GPS fix.

29. The wireless tracking device of claim 21, wherein the first QoS period corresponds to a maximum duration of a run-time of the GPS engine needed to obtain a fix in an indoor environment corresponding to at least a 95 percent yield rate.

30. The wireless tracking device of claim 21, wherein the second QoS period corresponds to a minimum run-time of the GPS engine needed to obtain a fix and maintain a geofence breach false alarm rate below a false alarm threshold.

31. A non-transitory computer readable storage medium having stored thereon processor-executable software instructions configured to cause a processor of a wireless tracking device to perform operations for a global positioning system (GPS) engine of the wireless tracking device, the operations comprising:
operating the GPS engine in an active geofence monitoring state for no more than a first quality of service (QoS) period to obtain a first GPS fix;
determining whether the GPS engine obtained the first GPS fix;
setting the GPS engine to operate in the active geofence monitoring state for no more than a second QoS period to obtain a second GPS fix in response to determining the first GPS fix was not obtained, wherein the second QoS period is less than the first QoS period;
determining whether a geofence breach is detected in response to determining the GPS engine obtained the first GPS fix;
setting the GPS engine to operate in the active geofence monitoring state for no more than the second QoS period to obtain the second GPS fix in response to determining the geofence breach is not detected; and
operating the GPS engine in the active geofence monitoring state to obtain the second GPS fix.

32. The non-transitory computer readable storage medium of claim 31, wherein the stored processor-executable instructions are configured to cause the processor of the wireless tracking device to perform operations further comprising:
operating the GPS engine to obtain the second GPS fix for no more than the first QoS period in response to determining the geofence breach is detected.

33. The non-transitory computer readable storage medium of claim 32, wherein the stored processor-executable instructions are configured to cause the processor of the wireless tracking device to perform operations further comprising:
determining a first actual time-to-fix in response to determining the GPS engine obtained the first GPS fix; and
setting the GPS engine to operate in the active geofence monitoring state for no more than the second QoS period to obtain the second GPS fix in response to determining the first actual time-to-fix is not below a QoS threshold.

34. The non-transitory computer readable storage medium of claim 33, wherein the stored processor-executable instructions are configured to cause the processor of the wireless tracking device to perform operations further comprising:
operating the GPS engine to obtain the second GPS fix for no more than the first QoS period in response to determining the first actual time-to-fix is below the QoS threshold.

35. The non-transitory computer readable storage medium of claim 33, wherein the stored processor-executable instructions are configured to cause the processor of the wireless tracking device to perform operations such that the QoS threshold corresponds to a statistical average time value needed to obtain a fix in a common indoor environment.

36. The non-transitory computer readable storage medium of claim 31 wherein the stored processor-executable instructions are configured to cause the processor of the wireless tracking device to perform operations further comprising:
determining a skip count of a number of prior times the GPS engine was set to operate in the active geofence monitoring state for no more than the second QoS period; and
setting the GPS engine to operate in the active geofence monitoring state for no more than the second QoS period to obtain the second GPS fix and incrementing the skip count in response to determining the skip count is not above a skip count threshold.

37. The non-transitory computer readable storage medium of claim 36, wherein the stored processor-executable instructions are configured to cause the processor of the wireless tracking device to perform operations further comprising:

operating the GPS engine to obtain the second GPS fix for no more than the first QoS period in response to determining the skip count is above the skip count threshold and the skip count may be reset.

38. The non-transitory computer readable storage medium of claim 31, wherein the stored processor-executable instructions are configured to cause the processor of the wireless tracking device to perform operations such that the geofence breach is determined when a region of uncertainty corresponding to a location of the first GPS fix does not overlap a geofence region associated with the GPS engine, wherein the region of uncertainty extends beyond a region of accuracy corresponding to the location of the first GPS fix.

39. The non-transitory computer readable storage medium of claim 31, wherein the stored processor-executable instructions are configured to cause the processor of the wireless tracking device to perform operations such that the first QoS period corresponds to a maximum duration of a run-time of the GPS engine needed to obtain a fix in an indoor environment corresponding to at least a 95 percent yield rate.

40. The non-transitory computer readable storage medium of claim 31, wherein the stored processor-executable instructions are configured to cause the processor of the wireless tracking device to perform operations such that the second QoS period corresponds to a minimum run-time of the GPS engine needed to obtain a fix and maintain a geofence breach false alarm rate below a false alarm threshold.

* * * * *